United States Patent [19]

Wamsley

[11] Patent Number: 4,679,924
[45] Date of Patent: Jul. 14, 1987

[54] CORONA DISCHARGE PHOTOGRAPHY

[76] Inventor: Allen W. Wamsley, 21829 Oakwood, East Detroit, Mich. 48021

[21] Appl. No.: 878,588

[22] Filed: Jun. 26, 1986

[51] Int. Cl.⁴ .................. G03B 41/00; H01T 19/00
[52] U.S. Cl. .......................................... 354/3; 354/62; 250/326; 361/225; 361/232
[58] Field of Search .................... 354/3, 62, 354; 250/324–326; 361/226, 232, 225, 230; 128/633, 665

[56] References Cited

U.S. PATENT DOCUMENTS 3,440,418 4/1969 Piazza ................................. 250/324
3,862,420 1/1975 Banks et al. ....................... 250/324

OTHER PUBLICATIONS

Boyers, David G. et al., "Corona Discharge Photography", Jul. 1973, J. Appl. Phys., vol. 44, No. 7, pp. 3102–3112.

Primary Examiner—W. B. Perkey
Attorney, Agent, or Firm—William L. Fisher

[57] ABSTRACT

In corona discharge photography method for photographing a speciman which utilizes a pulse generator, an amplifier, an electrode and a photographic medium, the improvement comprising providing a transmittance column and filling the transmittance column with an image-carrying solution and disposing the filled column between the electrode and the speciman, whereby to transmit corona discharge from the electrode to the speciman, the corona discharge occurring back and forth through the image-carrying solution to expose the photographic medium, such exposure occurring in part by transmittance column reflection.

14 Claims, 5 Drawing Figures

CORONA DISCHARGE PHOTOGRAPHY

BACKGROUND OF THE INVENTION

The present invention pertains to corona discharge means and method and has for its object the provision of improved corona discharge means and method permitting highly detailed imaging of nervous tissue and tooth structure without harmful radiation.

Corona photography has involved the placing of a photographic film or other recording medium in the vicinity of an electrode and the placing of a subject to be photographed in contact with the film emulsion. In the past, the method and device have been comprised of a pulse of high level voltage applied to the electrode with result that a corona discharge occurs around the subject, exposing the film.

Early work with corona discharge photography was done by S. D. Kirlian in the late 1930s and published in 1960s. As consequence, corona discharge photography is often referred to as Kirlian photography. Among the papers on the subject are the following: "Corona Discharge Photography" by David G. Boyers and William A. Tiller, *Journal of Applied Physics,* Vol. No. 7, pages 3002-3112, July 1973, "Biological Applications of Kirlian Photography" by Stanley Krippers, *Journal of the American Society of Psychosomatic Dentistry and Medicine,* Vol. 26, No. 4, pages 122-128, 1979, "Kirlian Photography, Myth, Fact and Applications", *Electro/78 Conference Record,* Institute of Electrical and Electronic Engineering, Inc. 1978. Each of these papers includes an extensive bibliography. U.S. Pat. No. 4,222,658 concerns a Kirlian apparatus as does U.S. Pat. No. 4,386,834. The International Kirlian Research Association founded in December 1974 correlates, standardizes, and promotes research into Kirlian photography.

Principal handicaps in the further development of Kirlian photography with which this invention is concerned have been its inability to photograph directly nervous tissue and tooth structure.

SUMMMARY OF THE INVENTION

The present invention is an improved corona discharge device and method that provides imaging capability of nervous tissue and tooth structure directly with repeatable, high-quality results. In accordance with one embodiment of the present invention, the improved corona discharge device is energized by an electrical pulse source such as a white noise generator with battery pulse source to assure that low-voltage electrical pulses are applied to the electrode of the corona discharge device and are of uniform magnitude, thereby providing consistent, repeatable results. The pulse voltage utilized in the corona discharge device in accordance with the present invention includes an amplifier for the electrical pulse source and a fly-back type transformer. The means and method of my invention include a column that is filled with an image-carrying solution of a solute have electrocharged particles, such as ions, and means coupling the pulse generating means to the image-carrying solution at one end of the column for application of the low-voltage pulses thereto to cause corona discharge into the other end of the column. This column is referred to herein as a transmittance column because it transmits the photographic image between the speciman and the photographic medium, but it also does more than merely transmit photographic energy. It also acts as a resonant medium which stores alternating type energy and amplifies the same particularly during corona discharge. A photographic recording medium is disposed adjacent the speciman to make a corona discharge thereonto.

In a preferred embodiment of the present invention, the means and method comprise pulse-generating means including a low-voltage white noise generator, electronic amplifier, an electrode placed on the back side of a filled dielectric film container that houses the photographic medium, a dielectric transmittance column, and flyback-type transformer that provides low electrical pulse levels or the order of 1 volt or less which contrasts with prior art devices having voltage levels of 12,000 volts or more. Said transmittance column is filled with an image-carrying solution preferably having ions in intimate contact with nascent gas. Hazards of exposure to harmful ionizing radiation from the device are eliminated which is a significant advantage over present day X-ray photography.

BRIEF DESCRIPTION OF THE DRAWINGS

The object and advantages of the present invention will become more apparent in the following detailed description and claims, particularly when considered in conjunction with the accompanying drawings in which like parts bear like reference numerals.

DETAILED DESCRIPTION OF THE INVENTION

Figure 1:
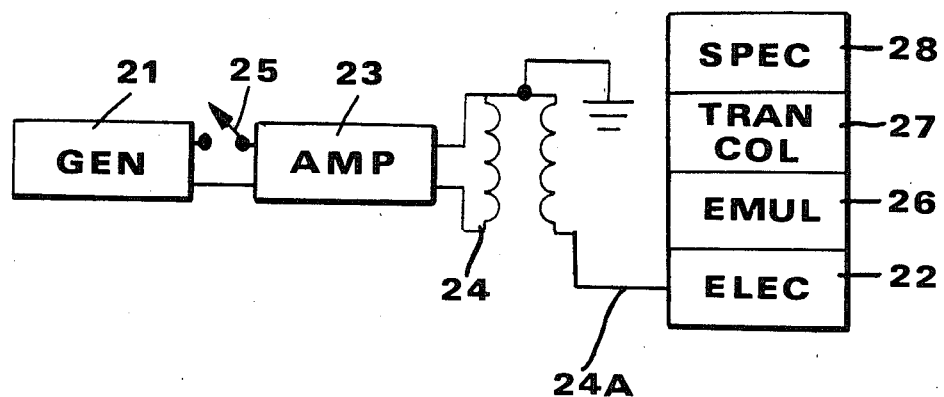
FIG. 1 is a schematic diagram in block form of means and method of corona discharge photography embodying my invention.

Referring to the drawings in greater detail and first to FIG. 1, there is depicted therein corona discharge photography in accordance with my invention. My invention is this embodiment utilizes prior art high-voltages but provides a filled transmittance column as will be described and a pulse signal fed electrode 22 via a pulse generator 21 and electronic amplifier 23 and a fly-back step-up transformer 24 having common grounded primary and secondary windings as shown. A single-pole single-throw switch 25 in one of the electrical lines of the circuit connecting the wave generator 21 and the electronic amplifier 23 represents conventional means of activating the pulse generator 21. The fly-back step-up transformer 24 has its primary winding connected to the output of the amplifier 23 and the output lead 24A of the its secondary connected to the electrode 22. The electrode 22 is disposed adjacent both a conventional separator(not shown) and a photographic recording medium 26 (for example, an unexposed photographic film). A speciman 28 of tooth structure or nervous tissue of which a corona discharge photograph is desired is disposed contiguous to the emulsion side of recording medium 26 through a filled transmittance column designated 27.

Waveform generator 21 applies prior art pulses of the order of 12,000 volts or more to electrode 22.

Figure 2:
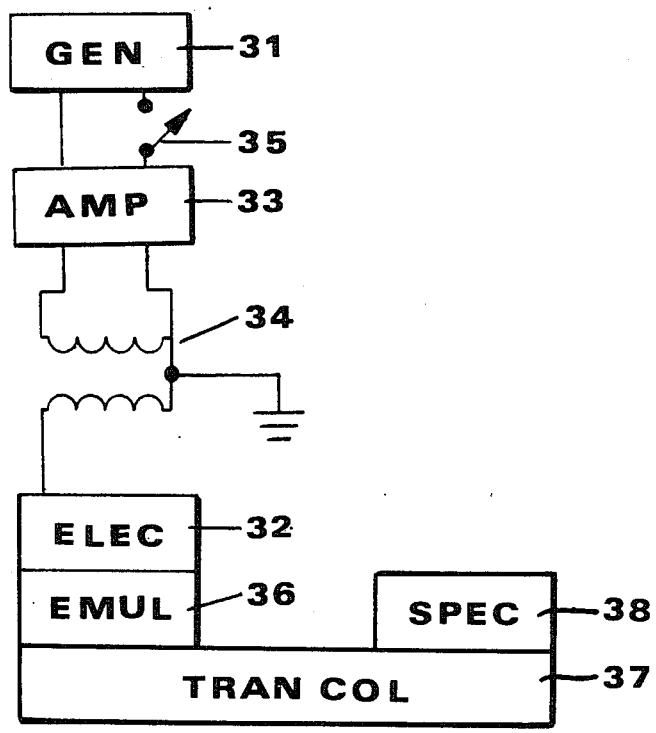
FIG. 2 is a similar diagram of another embodiment of my invention.

FIG. 2 depicts in block diagram form another embodiment of my improved corona discharge photography device and method. A white noise generator 31 is provided to produce electronic pulse inputs of low-voltage which are amplified by electronic amplifier 33 and impressed on the primary winding of a fly-back transformer 34 and transmitted to electrode 32. A single-pole single-throw switch 35 is connected into one of the electrical lines of the circuit connecting the white noise generator 31 and electronic amplifier 33 to indicate conventional means of activating the pulse generator 31. Corona discharge occurs back and forth through the filled transmittance column 37, exposing in part by transmittance column reflection, photographic medium 36. When recording medium 36 is subsequently developed, a corona discharge photography of the specimen 38 is obtained.

Figure 3:
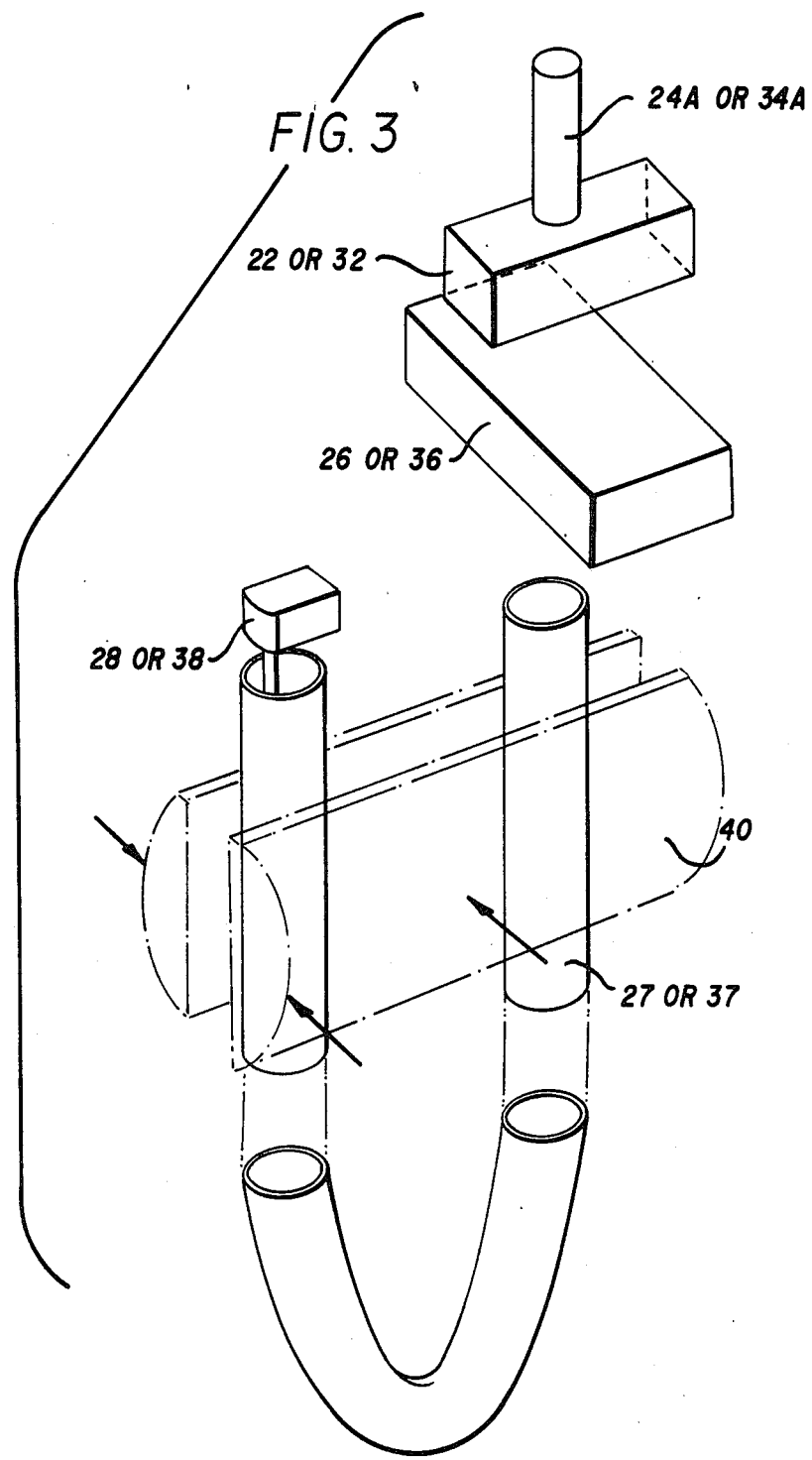
FIG. 3 is a perspective drawing showing a view of apparatus employed in schematic diagrams of FIGS. 1 and 2.

In the means and method depicted in FIG. 3 the two ends of filled transmittance column 27 or 37 are held in a holder 40 with speciman 28 or 38 to be photographed in contact with the image-carrying solution. A photographic recording medium 26 or 36 is placed adjacent the other end of the filled transmittance column 27 or 37 which is in contact with a side of photographic medium 26 or 36. The image-carrying solution can be electro positive or negative particles or ions preferably in intimate contact with nascent gas. When photographic medium 26 or 36 is subsequently developed a corona discharge photograph is obtained of speciman 28 or 38.

Figure 4:
FIGS. 4 and 5 are representations of photographs obtained by the device and method of my invention.
Figure 5:
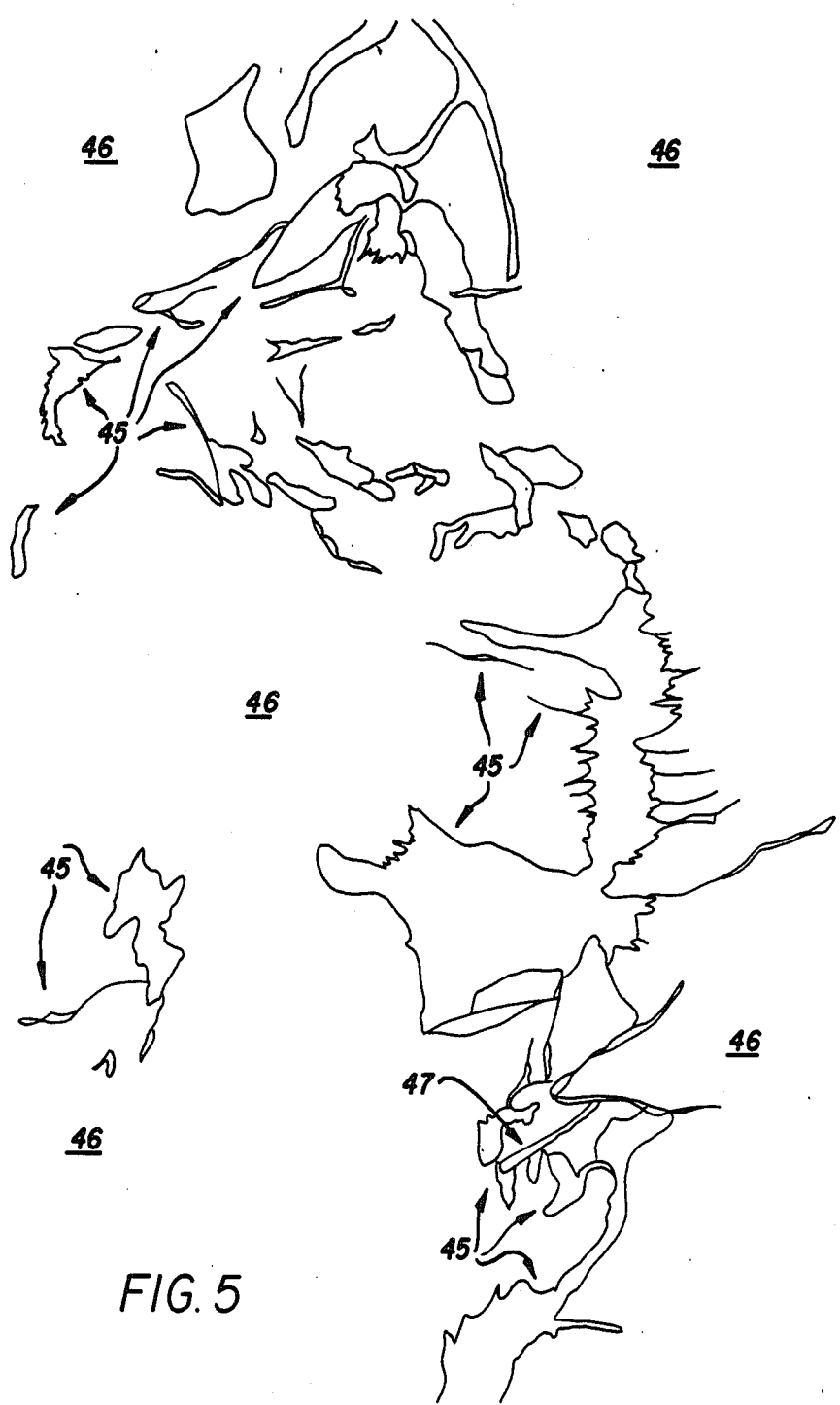

FIGS. 4 and 5 are drawings of corona discharge photographs of nervous tissue as photographed by the means and method embodied in FIGS. 1-3; FIG. 4 being of a living human brain and FIG. 5 being of a living animal brain, to wit: that of a salamander. In FIG. 4, reference numeral 42 designates radio opaque brain tissue. A streak, designated 44, is depicted at the top in FIG. 4 which the track of a moving charged particle (believed to be of the lepton family known as the muon, which is a type of short life electron). In FIG. 5 reference numeral 46 designates radio lucent brain tissue. A streak, designated 47, is at the bottom right of FIG. 5 and is believed to be the track of a moving muon similar to the streak 44 in FIG. 4 but of smaller length. The greater amount of opaque material 42 in FIG. 4 (with the greater length of the streak 44) in FIG. 4 for the first time visualizes the greater function of a living human brain in comparison to that of a living animal brain. Other photographs have been successfully obtained of human tooth structure by the means and method embodied in FIG. 1 (and FIG. 3).

It will thus be seen that there has been provided by my invention improved corona discharge photography means and method in which the object hereinabove set forth, together with many thoroughly practical advantages, has been successfully achieved. While preferred embodiments of my invention have been shown and described, it should be understood that variations and changes may be resorted to without departing from the spirit of my invention as defined in the appended claims.

What I claim is:

1. In an improved corona discharge photography means for photographing a speciman which utilizes a pulse generator, amplifier means, an electrode and a photographic recording medium, the improvement comprising a transmittance column disposed between the electrode and said speciman, said column being filled with an image-carrying solution to transmit corona discharge from an electrode to said speciman, said corona discharge occurring back and forth through said image-carrying solution to expose said photographic recording medium, said exposure occurring in part by transmittance column reflection.

2. Improvement in corona discharge photography means as claimed in claim 1 in which the image-carrying solution is comprised of a solute have electrocharged particles.

3. Improvement in corona discharge photography means as in claim 1 in which the image-carrying solution is comprised of negative and positive ions in intimate contact with nascent gas.

4. Improvement in corona discharge photography means as claimed in claim 1 in which the speciman is nervous tissue.

5. Improvement in corona discharge photography means as claimed in claim 1 in which the speciman is human brain tissue.

6. Improvement in corona discharge photography means as claimed in claim 1 in which the speciman is tooth structure.

7. In an improved corona discharge photography method for photographing a speciman which utilizes a pulse generator, amplifier means, an electrode and a photographic medium, the improvement comprising providing a transmittance column and filling said column with an image-carrying solution and disposing the filled column between the electrode and said speciman, whereby to transmit corona discharge from said electrode to said speciman, said corona discharge occurring back and forth through said image-carrying solution to expose said photographic medium in part by transmittance column reflection.

8. Improvement in corona discharge photography method as claimed in claim 7 in which the image-carrying solution is comprised of a solute having electrocharged particles.

9. Improvement in corona discharge photography method as claimed in claim 8 in which the image-carrying solution is comprised of a solute having negative and positive ions in intimate contact with nascent gas.

10. Improvement in corona discharge photography method as claimed in claim 7 in which the speciman is nervous tissue.

11. Improvement in corona discharge photography method as claimed in claim 7 in which the speciman is human brain tissue.

12. Improvement in corona discharge photography method as claimed in claim 7 in which the speciman is animal brain tissue.

13. Improvement in corona discharge photography as claimed in claim 7 further comprising the step of applying low-voltage (of the order of 1 volt or less) pulses to said electrode, whereby to eliminate radiation.

14. Improvement in corona discharge photography method as in claim 7 further comprising the step of applying to the image-carrying solution at one end of the said transmittance column and the step of applying a photographic medium and an electrode to said solution at the other end of said transmittance column.

* * * * *